United States Patent
Terashita

(10) Patent No.: US 6,952,223 B2
(45) Date of Patent: Oct. 4, 2005

(54) IMAGE PROCESSING METHOD AND APPARATUS

(75) Inventor: Takaaki Terashita, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/241,153

(22) Filed: Feb. 1, 1999

(65) Prior Publication Data

US 2002/0140825 A1 Oct. 3, 2002

(30) Foreign Application Priority Data

Jan. 30, 1998 (JP) .......................................... 10-018693

(51) Int. Cl.[7] .......................... H04N 5/228; H04N 5/225
(52) U.S. Cl. ............................... 348/222.1; 348/207.1; 348/207.2
(58) Field of Search ........................... 348/65, 72, 335, 348/552, 222.1, 211.6, 211.14, 207.1, 207.2, 223.1, 254, 222, 211

(56) References Cited

U.S. PATENT DOCUMENTS 5,040,068 A * 8/1991 Parulski et al. ............. 348/376
5,488,414 A * 1/1996 Hirasawa et al. ........... 348/334
5,493,332 A * 2/1996 Dalton et al. ................. 348/72
6,118,473 A * 9/2000 Tsunezune et al. ......... 348/211
2001/0013894 A1 * 8/2001 Parulski et al. ............. 348/207

FOREIGN PATENT DOCUMENTS

| JP | 62-016694 | 1/1987 |
| JP | 9-030890 | 2/1997 |

* cited by examiner

Primary Examiner—Aung Moe
(74) Attorney, Agent, or Firm—Morgan, Lewis & Bockius LLP

(57) ABSTRACT

In an image processing method for carrying out image processing on digital image signals, which have been acquired with digital cameras, image processing is carried out on the digital image signals and under different image processing conditions in accordance with kinds of the digital cameras. The image processing is thereby carried out such that reproduced images having good image quality may be obtained regardless of the kinds of the digital cameras. An apparatus for carrying out the image processing method comprises an input device for inputting pieces of information, which represent kinds of the digital cameras, and an image processing unit for carrying out image processing on the digital image signals and under different image processing conditions in accordance with the kinds of the digital cameras, which are represented by the pieces of information inputted from the input device.

10 Claims, 1 Drawing Sheet

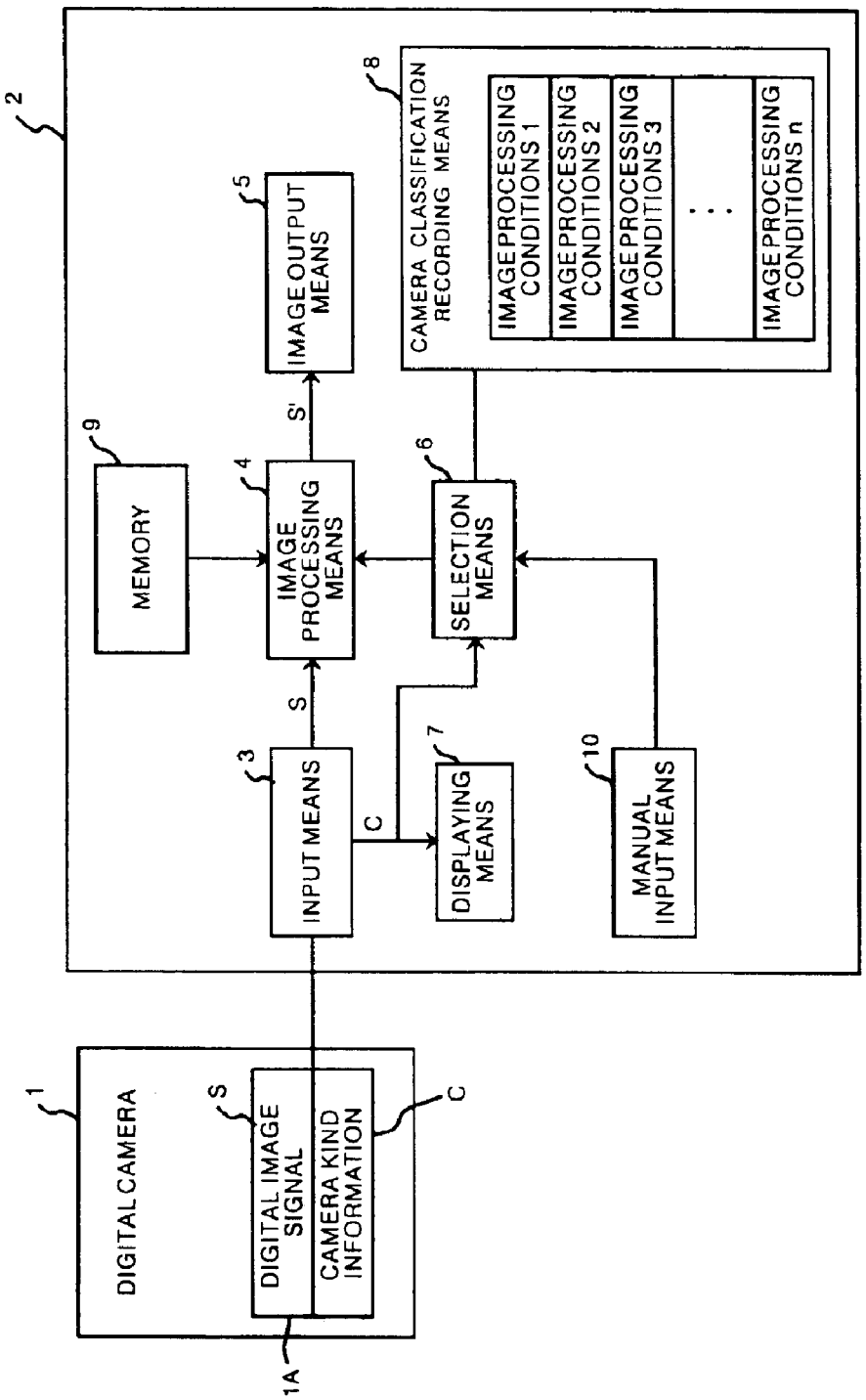

IMAGE PROCESSING METHOD AND APPARATUS

BACKGROUND OF THE INVENTION

1. Field of the Invention

This invention relates to an image processing method and apparatus for carrying out image processing on digital image signals, which have been acquired with digital cameras.

2. Description of the Prior Art

With digital electronic still cameras (hereinbelow referred to as digital cameras), an image having been acquired with a photographing operation can be stored as a digital image signal on a recording medium, such as an internal memory or an IC card provided in the digital camera. The image having been acquired with the photographing operation can then be reproduced from the stored digital image signal with a printer or a monitor. In cases where the image having been acquired with the digital camera is to be printed, it is desired that an image having image quality as good as the image quality of a photograph printed from negative film can be obtained.

The digital camera is constituted of elements, such as an optical system (an aperture, a shutter, and a strobe), an imaging system (a CCD image sensor and a signal processing system), a control system (AE, AW, and AF), and a recording-reproducing system (compression-decompression, memory control, and displaying). Factors, which affect the image quality of the reproduced image, among these elements include a color temperature of strobe light, AE control, AW control, a CCD color-separation color filter, the number of picture elements, gradation conversion, and matrix operation processing for obtaining luminance and color difference signals. With the digital camera, these factors are controlled, and a digital image signal is acquired such that a reproduced image having good image quality may be obtained.

With the digital camera, instead of the acquired image being submitted to a photo processing shop, the photographer himself can print the acquired image by using a printer or can reproduce the acquired image on a monitor. Therefore, the user can freely print images by himself. However, in order for a print having satisfactory image quality to be obtained, it is necessary that a visible image is temporarily reproduced from the acquired digital image signal with a printer or a monitor and a correction is made by seeing the reproduced image. Therefore, in cases where a large number of prints are to be formed, considerable time and labor are required, and prints cannot be formed efficiently. Accordingly, it is desired that, as in conventional photographic film, the photographer asks a photo processing shop to form prints from the digital image signal such that printed images having good image quality may be obtained.

However, as described above, the factors affecting the image quality of the images reproduced from digital image signals acquired with digital cameras vary for different kinds of cameras, such as different manufacturers and different device types of the digital cameras. Therefore, in a photo processing shop in which prints are to be formed from digital image signals having been acquired with various different kinds of digital cameras, it is difficult to obtain printed images having uniform good image quality from all of the given digital image signals. For example, the forms of acquisition of digital image signals with digital cameras can be classified into a complementary color type and a primary color type in accordance with the device types of digital cameras. With the primary color type of digital camera, a digital image signal can be obtained such that comparatively bright colors may be reproduced. With the complementary color type of digital camera, the R, G, and B colors are presumed from Y, M, and C, and ordinarily the digital image signal is obtained such that the colors cannot be reproduced brightly as with the primary color type of digital camera. Therefore, in photo processing shops, it is necessary that visible images are temporarily reproduced with a printer or a monitor and a correction is made through trial and error. Thus the prints cannot be formed efficiently.

SUMMARY OF THE INVENTION

The primary object of the present invention is to provide an image processing method, wherein image processing is carried out on digital image signals acquired with digital cameras such that reproduced images having good image quality may be obtained regardless of the kinds of the digital cameras.

Another object of the present invention is to provide an apparatus for carrying out the image processing method.

The present invention provides an image processing method for carrying out image processing on digital image signals, which have been acquired with digital cameras, the method comprising the steps of:

carrying out image processing on the digital image signals and under different image processing conditions in accordance with kinds of the digital cameras.

Examples of the image processing conditions include the values for correction of gradation of the digital image signals, and the values for correction of colors. However, the image processing conditions are not limited to such values.

The image processing method in accordance with the present invention should preferably be modified such that statistical information of the digital image signals (acquired with the same kind of digital cameras) may be calculated, and the image processing conditions may be determined in accordance with the statistical information.

By way of example, the statistical information can be obtained by integrating mean values of all picture element values of a plurality of digital image signals, mean values of picture element values at highlight points or highlight image portions in the plurality of digital image signals, mean values of contrast of the images represented by the plurality of digital image signals, or mean values of colors or saturation of the images represented by the plurality of digital image signals, and thereafter calculating a mean value of the thus obtained values. From the statistical information, a center color temperature, a mean color, mean gradation, color reproducibility, or the like, can be presumed with respect to each kind of cameras.

Also, the image processing method in accordance with the present invention should preferably be modified such that the kinds of the digital cameras may be displayed.

Further, the image processing method in accordance with the present invention should preferably be modified such that pieces of information, which represent the kinds of the digital cameras, may be appended to the digital image signals. Alternatively, pieces of information, which represent the kinds of the digital cameras, may be inputted manually.

The present invention also provides an image processing apparatus for carrying out image processing on digital image signals, which have been acquired with digital cameras, the apparatus comprising:

i) an input means for inputting pieces of information, which represent kinds of the digital cameras, and ii) an image processing means for carrying out image processing on the digital image signals and under different image processing conditions in accordance with the kinds of the digital cameras, which are represented by the pieces of information inputted from the input means.

In the image processing apparatus in accordance with the present invention, the image processing means should preferably be provided with a storage means for storing pieces of information, which represent different image processing conditions, for respective kinds of the digital cameras, and a selection means for selecting image processing conditions, which have been stored in the storage means, in accordance with the kinds of the digital cameras.

Also, the image processing means should preferably be provided with a statistical information calculating means for calculating statistical information of the digital image signals, and a determination means for determining the image processing conditions in accordance with the statistical information.

Further, the image processing apparatus in accordance with the present invention should preferably further comprise a displaying means for displaying the kinds of the digital cameras.

Furthermore, the image processing apparatus in accordance with the present invention should preferably be modified such that the pieces of information, which represent the kinds of the digital cameras, may be appended to the digital image signals, and the input means may read the pieces of information, which represent the kinds of the digital cameras and which have been appended to the digital image signals. Alternatively, the input means may be means for manually inputting the pieces of information, which represent the kinds of the digital cameras.

With the image processing method and apparatus in accordance with the present invention, the image processing is carried out on the digital image signals and under different image processing conditions in accordance with the kinds of the digital cameras. Therefore, the image processing can be carried out on the digital image signals, which have been acquired with digital cameras, such that reproduced images having uniform image quality may be obtained regardless of the kinds of the digital cameras. Accordingly, reproduced images having good image quality can be obtained regardless of the kinds of the digital cameras. Also, it becomes unnecessary for the user himself to make a correction of an image for each kind of digital camera, and therefore image reproduction can be carried out efficiently.

With the image processing method and apparatus in accordance with the present invention, wherein the statistical information of the digital image signals is calculated, and the image processing conditions are determined in accordance with the statistical information, the image processing conditions can be determined such that more appropriate reproduced images may be obtained. Therefore, reproduced images having image quality enhanced even further can be obtained.

With the image processing method and apparatus in accordance with the present invention, wherein the kinds of the digital cameras are displayed, it becomes possible to confirm the kind of the digital camera, in which the user takes interest. Therefore, the image processing conditions can be determined more appropriately in accordance with the kind of the camera.

BRIEF DESCRIPTION OF THE DRAWING

FIG. 1 is a block diagram showing an image reproducing system, in which an embodiment of the image processing apparatus in accordance with the present invention is employed.

DESCRIPTION OF THE PREFERRED EMBODIMENTS

The present invention will hereinbelow be described in further detail with reference to the accompanying drawings.

FIG. 1 is a block diagram showing an image reproducing system, in which an embodiment of the image processing apparatus in accordance with the present invention is employed. The image reproducing system shown in FIG. 1 is provided with an image reproducing apparatus 2 for reproducing a visible image from a digital image signal S, which has been acquired with a digital camera 1.

The digital camera 1 appends information (hereinbelow referred to as the camera kind information) C, which represents the kind of the camera, such as the manufacturer and the device type of the digital camera 1, as tag information to the digital image signal S, which is acquired by taking a photograph of an object. The digital image signal S appended with the camera kind information C is recorded on a recording medium 1A, such as a floppy disk.

The image reproducing apparatus 2 comprises an input means 3 for reading the digital image signal S and the camera kind information C from the recording medium 1A, and an image processing means 4 for carrying out image processing on the digital image signal S in the manner, which will be described later, and thereby obtaining a processed image signal S'. The image reproducing apparatus 2 also comprises an image output means 5 for reproducing a printed image from the processed image signal S', and a displaying means 7, such as a monitor, for displaying the information, which represents the camera kind, in accordance with the camera kind information C. The image reproducing apparatus 2 further comprises camera classification recording means 8, in which the pieces of information representing the image processing conditions (1, 2, 3, ..., n) varying for different camera kinds have been recorded, and a selection means 6 for selecting the image processing conditions, which correspond to the camera kind, from the camera classification recording means 8 and in accordance with the camera kind information C. The image reproducing apparatus 2 still further comprises a memory 9 for storing image processing parameters, which are common to the camera kinds and will be described later, and a manual input means 10, such as a keyboard, for manually inputting various kinds of information.

In the digital camera 1, the camera kind information C is recorded on the recording medium 1A as the tag information of the digital image signal S and with respect to each image. As the standard for recording the camera kind information C as the tag information, for example, "Baseline TIFF Rev.6. ORGB Full Color Image," which is employed as an uncompressed file of Exif file, may be employed.

In the camera classification recording means 8, pieces of information representing the image processing conditions, which are optimum for the digital image signal S having been acquired with the digital camera 1 belonging to each of the camera kinds, have been recorded. In accordance with the camera kind information C having been inputted into the image reproducing apparatus 2, the selection means 6 selects the optimum image processing conditions from the camera classification recording means 8. Also, the image processing means 4 carries out the image processing on the digital image signal S and under the selected image processing conditions. Examples of the image processing conditions include the values for gradation correction and the values for color correction.

In digital cameras, various types of gradation conversion varying for different camera kinds are carried out, and the digital image signals are thereby acquired. Therefore, the gradation correction is carried out such that the reproduced images may have uniform gradation regardless of the camera kinds. Examples of the values for gradation correction include the gradation correction coefficient, i.e. the gradation coefficient by which the digital image signal S is to be multiplied. In the image processing means 4, the digital image signal S, which is constituted of antilogarithms, is logarithmically converted, and the logarithmically converted digital image signal S is multiplied by the gradation coefficient. Also, the digital image signal S having been multiplied by the gradation coefficient is subjected to inverse logarithmic conversion, and the processed image signal S' is thereby obtained. In cases where the digital image signal S is logarithmically converted, the correction can be effected in the same manner with respect to the region ranging from a highlight portion to a shadow portion in the image. Therefore, the image processing should preferably be carried out by logarithmically converting the digital image signal S. However, instead of the logarithmic conversion being carried out, the image processing may be carried out by adjusting the gradation coefficient. Also, it often occurs that, at only a highlight portion or a shadow portion of an image, the characteristics vary markedly for different camera kinds. In such cases, the multiplication by the gradation coefficient may be carried out with respect to only the highlight portion or the shadow portion of the image. Further, the values for the gradation correction may be recorded as a gradation conversion table in the camera classification recording means 8, and the digital image signal S may be converted by making reference to the gradation conversion table.

Also, in digital cameras, various types of color correction varying for different camera kinds are carried out, and the digital image signals are thereby acquired. Therefore, the color correction is carried out such that the reproduced images may have uniform colors regardless of the camera kinds. In cases where a print is reproduced from the digital image signal S having been acquired with the digital camera 1, the color reproducibility varies depending upon the photosensitive material, on which the print is formed. Therefore, it is necessary for the color reproducibility to be optimized in accordance with the combination of the digital image signal S and the photosensitive material used for the printing. Ordinarily, for such purposes, matrix coefficients are set. The matrix coefficients should preferably be set such that the colors may be reproduced as brightly as possible. However, in cases where the color correction has already been carried out on the digital image signal S in the digital camera 1 such that the colors can be reproduced brightly, if the operation with the matrix coefficients is carried out, the problems will occur in that the gradation is lost at a bright color portion, in that a color change occurs, or in that a failure occurs with flesh color or gray. Therefore, the information representing the matrix coefficients, which are appropriate for each camera kind, is recorded in the camera classification recording means 8. In this manner, an image can be reproduced such that it may have optimum colors regardless of the camera kinds.

As the matrix for the color correction, three matrix coefficients and offset values may be employed with respect to the R, G, and B three color signals. Also, nine matrix coefficients and offset values may be employed with respect to R, G, B, RG, GB, BR, $R^2$, $G^2$, and $B^2$ of the three color signals. In this manner, the center color temperature of the printed image can be altered, and the color reproduction characteristics (the saturation, the hue, and the color balance) of the printed image can be altered. Besides the matrix coefficients, the offset values for respective colors for correcting the R, G, and B three color signals with respect to only a predetermined color may be employed as the values for the color correction.

As the image processing conditions recorded in the camera classification recording means 8, besides the values for the gradation correction and the values for the color correction, various parameters may also be recorded. Examples of such parameters include a parameter for edge emphasis, a parameter for gradation balance correction, a parameter for correcting colors changing when image density is corrected manually, and a parameter for correcting the gradation changing when image density is corrected manually.

In the camera classification recording means 8, the image processing conditions with respect to all of the camera kinds need not necessarily be recorded, and only the image processing conditions corresponding to camera kinds yielding bad image quality and camera kinds, with which the prints having image quality enhanced even further are to be formed, may be recorded. Also, instead of the image processing conditions being registered, only the camera kinds may be registered. In such cases, information representing the necessary image processing conditions may be inputted from the manual input means 10, or may be inputted from a recording medium, which is furnished by the manufacturer of the image reproducing apparatus 2, or the like. In cases where new camera kind information C, which has not been recorded in the camera classification recording means 8, is inputted, the new camera kind information C and the corresponding image processing conditions may be registered automatically in the camera classification recording means 8.

How this embodiment operates will be described hereinbelow.

Firstly, a photograph of an object is taken with the digital camera 1, and the digital image signal S is thereby acquired. The camera kind information C is appended as the tag information to the digital image signal S, and the digital image signal S and the camera kind information C are recorded on the recording medium 1A. The input means 3 of the image reproducing apparatus 2 reads the digital image signal S and the camera kind information C from the recording medium 1A, feeds the digital image signal S into the image processing means 4, and feeds the camera kind information C into the displaying means 7 and the selection means 6. The displaying means 7 displays the camera kind. With the displaying means 7, the user can confirm the camera kind, with which the digital image signal S was acquired. In accordance with the received camera kind information C, the selection means 6 selects the image processing conditions, which correspond to the camera kind information C, from the camera classification recording means 8. The information representing the selected image processing conditions is fed into the image processing means 4. In cases where the image processing conditions, which correspond to the inputted camera kind information C, are not present in the camera classification recording means 8, the user inputs the image processing conditions from the manual input means 10. In such cases, the user may arbitrarily input the image processing conditions from the manual input means 10 and in accordance with the camera kind, which is displayed on the displaying means 7.

In the image processing means 4, the image processing is carried out on the digital image signal S under the image processing conditions, which have been received from the selection means 6, and in accordance with the common image processing parameters, which are recorded in the memory 9. The processed image signal S' is obtained from the image processing. The processed image signal S' is fed into the image output means 5, and a printed image is reproduced from the processed image signal S'.

As described above, with this embodiment, the camera kind information C, which represents the camera kind of the digital camera 1 having acquired the digital image signal S, is appended to the digital image signal S. Also, in the image reproducing apparatus 2, the image processing conditions optimum for the camera kind are selected in accordance with the camera kind information C, and the image processing is carried out under the selected image processing conditions. Therefore, even if the image processing conditions with respect to the gradation, the colors, and the like, which are employed when the digital image signal S is acquired, vary for different camera kinds, printed images, which have been subjected to uniform image processing, can be obtained regardless of the camera kinds. Accordingly, images having good image quality can be obtained regardless of the camera kinds. Also, it becomes unnecessary for the user to make a correction of the image through trial and error, and therefore the image reproduction can be carried out efficiently.

In the embodiment described above, the camera kind information C is appended to the digital image signal S and is fed from the input means 3 into the image reproducing apparatus 2. Alternatively, instead of the camera kind information C being appended to the digital image signal S, the camera kind information C may be inputted from the manual input means 10 when the digital image signal S is inputted.

Also, in the camera classification recording means 8, besides the image processing conditions, the statistical information with respect to the digital image signals S (acquired with the same kind of digital cameras) may also be recorded. Specifically, with respect to a plurality of the digital image signals S acquired with the same kind of digital cameras, the mean values of the digital image signals S (such as the mean values of all picture element values, the mean values of picture element values at highlight points or highlight image portions, the mean values of contrast of the images, or the mean values of colors or saturation of the images) may be integrated. Thereafter, the mean value of the thus obtained values may be calculated. In this manner, the center color temperature, the mean color, the contrast characteristics, the color reproducibility, or the like, can be presumed with respect to each kind of cameras. Therefore, in accordance with the center color temperature, the mean color, the contrast characteristics, and the color reproducibility, which have thus been presumed, the correction values and parameters may be calculated such that the digital image signal S can be reproduced as an image with an appropriate color temperature, appropriate gradation, and appropriate color reproducibility. Information representing the thus calculated correction values and parameters may be recorded in the camera classification recording means 8. In this manner, the image processing conditions can be corrected more appropriately, and printed images having image quality enhanced even further can thereby be obtained. In such cases, the statistical information may be calculated with respect to the image density of each of the R, G, and B colors, and information representing the three-color gradation balance may be recorded in the camera classification recording means 8. In this manner, the three-color gradation balance can be corrected.

What is claimed is:

1. An image processing method for carrying out image processing on digital image signals that have been acquired by a particular model of a plurality of different models among a plurality of different manufacturers of color digital cameras, the method comprising the steps of:

receiving the digital image signals;

receiving camera model information which represents at least one of color and contrast response characteristics of the particular model of color digital camera used to acquire the digital image signals;

selecting optimum image processing conditions from a plurality of stored image processing conditions in accordance with the camera model information, wherein each of the stored image processing conditions corresponds to respective different ones of the plurality of models among of the plurality of different manufacturers of color digital cameras and the at least one of color and contrast response characteristics thereof; and carrying out color image printing of the digital image signals using the selected optimum image processing conditions.

2. A method as defined in claim 1 wherein statistical information of the digital image signals is calculated, and the predetermined image processing conditions are determined in accordance with said statistical information.

3. A method as defined in claim 1 wherein the different models of digital cameras are displayed.

4. A method as defined in claim 1 wherein the camera model information is appended to the digital image signals.

5. A method as defined in claim 1 wherein the camera model information is inputted manually.

6. An image processing apparatus for carrying out image processing on digital image signals that have been acquired by a particular model of a plurality of different models among a plurality of different manufacturers of color digital cameras, the apparatus comprising:

input portion to receive the digital image signals;

receiving portion to receive camera model information which represents at least one of color and contrast response characteristics of the particular model of color digital camera used to acquire the digital image signals;

selecting portion to select optimum image processing conditions from a plurality of stored image processing conditions in accordance with the camera model information, wherein each of the stored image processing conditions corresponds to respective different ones of the plurality of models among of the plurality of different manufacturers of color digital cameras and the at least one of color and contrast response characteristics thereof; and image processing portion to carry out color image printing of the digital image signals using the selected optimum image processing conditions.

7. An apparatus as defined in claim 6 wherein said image processing portion is provided with statistical information calculating portion for calculating statistical information of the digital image signals, and determination portion for determining the predetermined image processing conditions in accordance with said statistical information.

8. An apparatus as defined in claim 6 wherein the image processing apparatus further comprises displaying portion for displaying the different models of digital cameras.

9. An apparatus as defined in claim 6 wherein the camera model information is appended to the digital image signals.

10. An apparatus as defined in claim 6 wherein said input portion manually inputs the camera model information.

* * * * *